United States Patent [19]

Bragenzer et al.

[11] Patent Number: 4,914,419

[45] Date of Patent: Apr. 3, 1990

[54] SINGLE-WIRE ENGINE INDICATOR DEVICE

[75] Inventors: Richard J. Bragenzer, Kenosha, Wis.; Donald H. Wood, Gurnee, Ill.

[73] Assignee: Outboard Marine Corporation, Waukegan, Ill.

[21] Appl. No.: 201,085

[22] Filed: Jun. 1, 1988

[51] Int. Cl.$^4$ .............................................. B60Q 1/00
[52] U.S. Cl. .................................... 340/459; 340/450.3
[58] Field of Search ..................... 340/459, 450.3, 449, 340/438, 508, 510, 511, 519, 521, 526

[56] References Cited

U.S. PATENT DOCUMENTS

| | | | |
|---|---|---|---|
| 3,866,202 | 2/1975 | Reiss et al. | 340/511 |
| 3,890,595 | 6/1975 | Barabino . | |
| 3,976,989 | 8/1976 | Smith . | |
| 4,015,237 | 3/1977 | Takatani et al. | 340/459 |
| 4,019,489 | 4/1977 | Cartmill | 340/611 X |
| 4,072,924 | 2/1978 | Pomerantz | 340/519 X |
| 4,088,987 | 5/1978 | Resler et al. . | |
| 4,101,001 | 7/1978 | Smith . | |
| 4,488,140 | 12/1984 | Lang et al. . | |
| 4,489,311 | 12/1984 | Lang et al. . | |
| 4,503,431 | 3/1985 | Raab | 340/459 X |
| 4,613,851 | 9/1986 | Hines . | |
| 4,677,308 | 6/1987 | Wroblewski et al. | 340/459 X |
| 4,749,986 | 6/1988 | Otani et al. | 340/511 X |
| 4,791,311 | 12/1988 | Vig | 340/438 X |

Primary Examiner—Joseph A. Orsino
Assistant Examiner—Brian R. Tumm
Attorney, Agent, or Firm—Welsh & Katz, Ltd.

[57] ABSTRACT

An indicator of operating conditions in an internal combustion marine engine displays information about a plurality of engine conditions in response to signals communicated from a remote location over a single wire. Different engines troubles are identified by rectangular voltage wave forms of different duty cycles on the single wire. A logic circuit detects a particular duty cycle and actuates an alarm in response to the detected signal. It is thus possible to alert an operator at a remote location to conditions such as low oil pressure, zero oil pressure or overtemperature by use of a single wire connected to the engine.

21 Claims, 3 Drawing Sheets l
SINGLE-WIRE ENGINE INDICATOR DEVICE

BACKGROUND OF THE INVENTION

This invention relates to an indicator of operating conditions in an internal-combustion engine. More particularly, it is an apparatus for indicating one of a plurality of conditions of an internal combustion engine, such as an outboard marine engine, at a remote location by an electrical connection that comprises a single insulated conducting wire.

Internal-combustion engines typically require the circulation of oil under pressure to lubricate working parts, and are typically designed to operate at or under a maximum temperature. It is common to monitor the presence and circulation of oil for lubrication by monitoring oil pressure. Marine engines may be air-cooled, but are more typically cooled by circulating water. Any failure of that circulation rapidly causes an increase in the temperature of the engine. Either an increase in engine temperature or a decrease in oil pressure represents information that should be communicated to the operator of the engine who can then take action to prevent damage to the engine. When the operator is located at a distance from the engine, as when the engine is controlled from the front of the boat, a remote pilot house or the like, it is necessary to communicate information detected by sensors at the engine to the remote location.

One attempt at solving the problem described above has been disclosed in U.S. Pat. No. 4,019,489, entitled "Safety Apparatus for Engines." The '489 patent discloses a system that is responsive to water pressure, oil pressure, and engine temperature. Each of these variables is detected by a conventional sensor that is connected by its own insulated wire to an electronic circuit at a remote location in a pilot house or the like. The use of such separate wires requires a multiwire cable or the equivalent connecting the engine with the control area. This represents a disadvantage that is overcome by the present invention.

SUMMARY OF THE INVENTION

Accordingly, it is a primary object of the present invention to provide a better apparatus for indicating operating problems of an internal-combustion engine at a location remote from the engine.

It is a further object of the present invention to provide an indicator for an outboard marine engine that connects the engine and a remote control area by a single Wire that carries information about a plurality of malfunctions.

Other objects and advantages will become apparent in the course of reading a detailed description of the invention.

An indicator of operating conditions in an outboard marine engine displays information about a plurality of engine conditions in response to signals communicated from a remote location over a single wire. Different engine trouble conditions are identified by periodic voltage waves of different duty cycles on the single wire. A logic circuit detects a particular duty cycle and actuates an alarm in response to the detected signal. It is thus possible to alert an operator at a remote location to conditions such as low oil pressure, zero oil pressure or engine overtemperature by means of a single wire connected to a signal source that is coupled to various sensors that are operationally connected to monitor operating conditions of the engine.

DETAILED DESCRIPTION OF THE INVENTION

Figure 1:
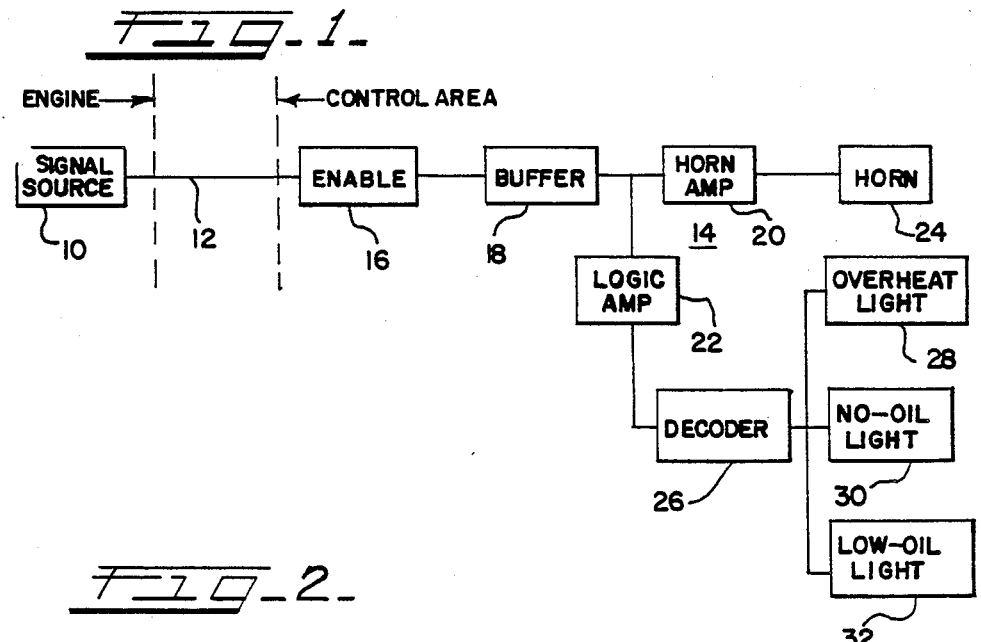
FIG. 1 is a functional block diagram of a circuit for the practice of the present invention.

Broadly stated, the present invention is directed to an indicator apparatus that can alert an operator of an internal combustion engine to several potential engine problem conditions at a remote location by means of a single wire interconnecting sensor at the engine and the indicator apparatus. A functional block diagram of a circuit for the practice of the present invention is shown in FIG. 1. In FIG. 1, a signal source 10 is located at an internal-combustion engine such as an outboard marine engine. The signal source 10 is responsive to a plurality of engine conditions such as no oil, low oil, engine overtemperature or the like. The signal source 10 is connected by a single electrically conducting and electrically insulated Wire 12 to an electronic circuit, indicated generally at 14, that is located in a control area such as the cockpit or pilothouse of a boat. The wire 12 is connected to an enable unit 16 that interrupts a connection to the wire 12 to facilitate operation of the signal source 10. The enable unit 16 is connected to a buffer 18 which produces an output that is connected both to a horn amplifier 20 and a logic amplifier 22. The horn amplifier 20 drives a horn 24 that produces an audible indication corresponding to the particular trouble detected by the signal sources 10. The logic amplifier 22 is connected to a decoder 26 which produces an output corresponding to the particular signal from the signal source 10. Outputs of the decoder 26 are here indicated as an overheat light 28, a no-oil light 30 and a low-oil light 32. The three lights 28, 30 and 32 are shown here as the likely troubles of choice in an outboard marine engine, but it should be evident that more or different indicators could be utilized if desired.

Figure 2:
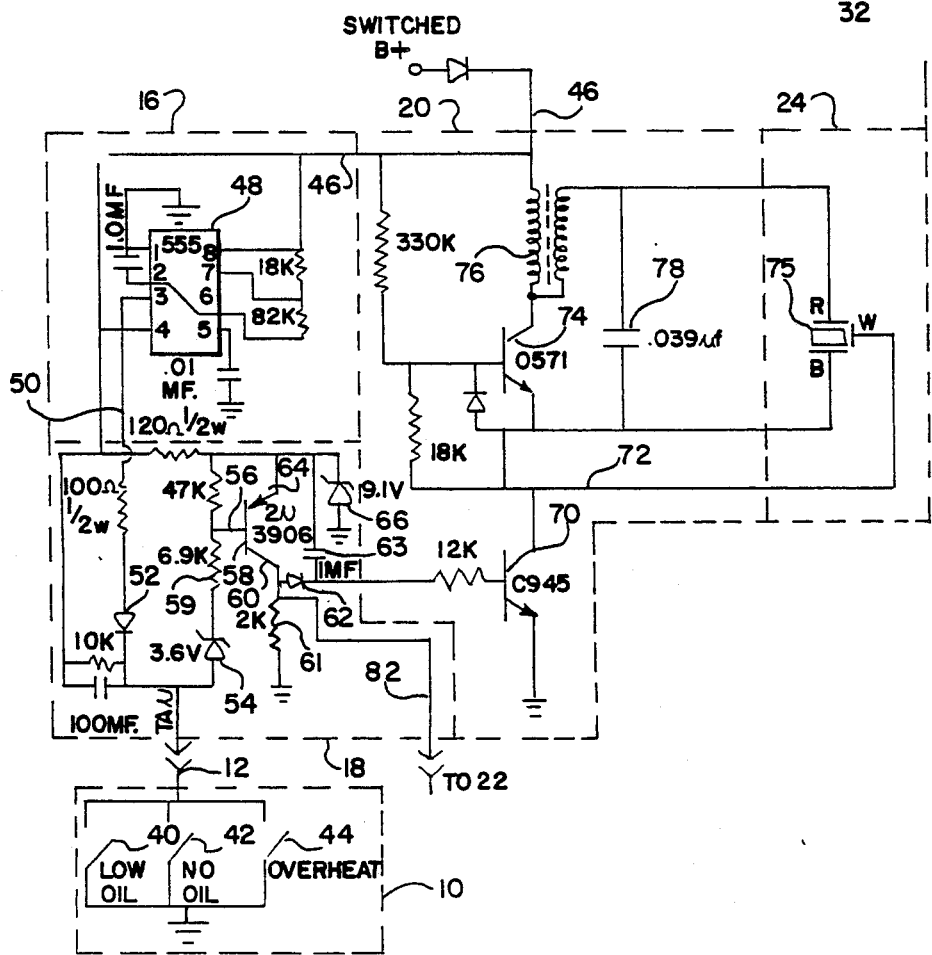
FIGS. 2 and 3 together comprise an electrical schematic circuit diagram that can be used to carry out the operation of the block diagram of FIG. 1.
Figure 3:
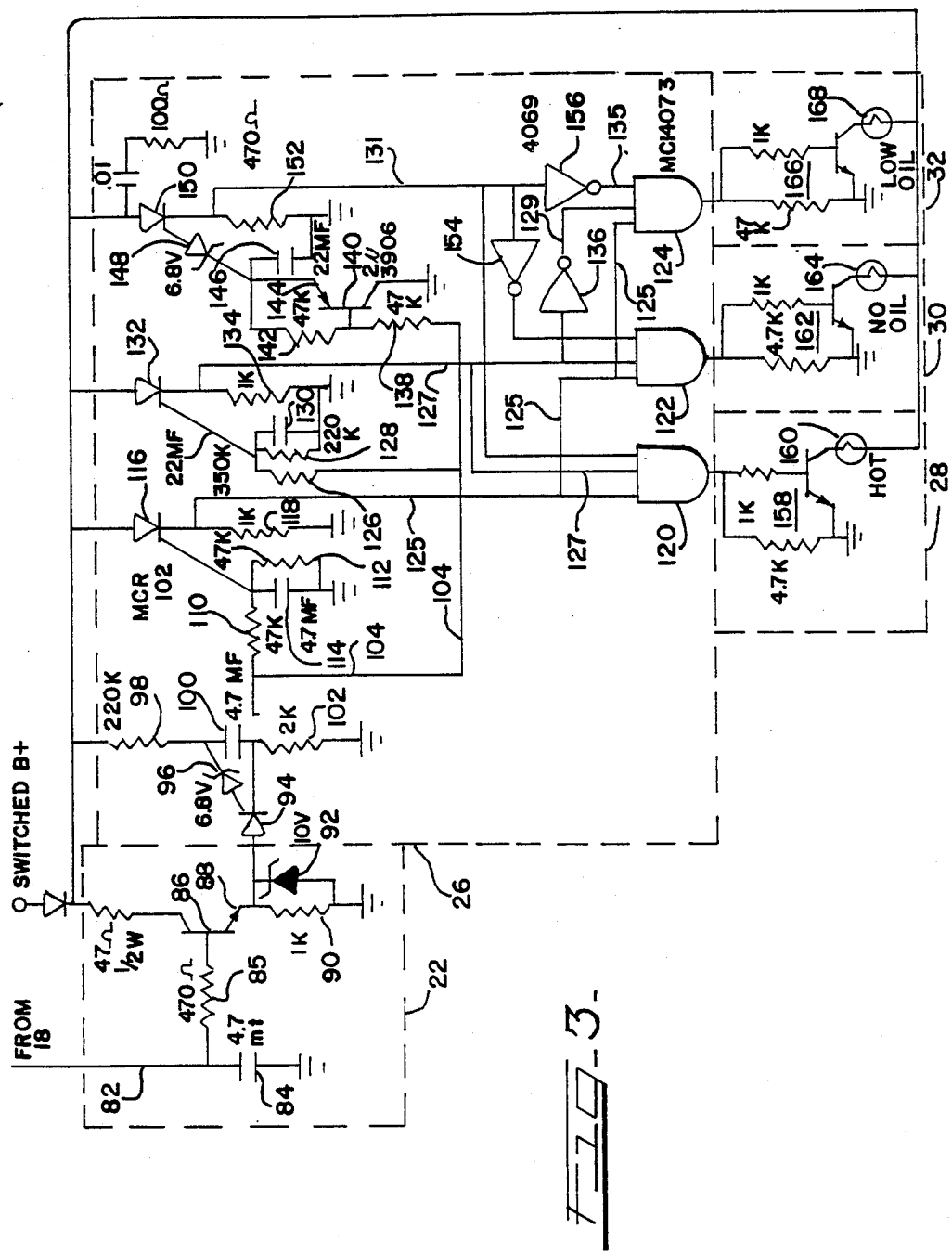

FIGS. 2 and 3 together represent a circuit embodying the block diagram of FIG. 1. In FIGS. 2 and 3, the signal source 10 is represented symbolically as a low-oil switch 40, a no-oil switch 42, and an overheat switch 44. The switches 40, 42 and 44 are operated at different duty cycles to produce signals that are taken on the single signal wire 12 to the electronic circuit 14. The switches 40, 42 and 44 thus produce a periodic rectangular waveform. This is a particularly simple signal. Other waveforms of different duty cycles could obviously be used. The switches 40 and 42 are symbolic representations of circuits that apply intermittent ground connections to the wire 12 upon the detection of a low-oil or a no-oil condition. The switch 44 is typically a thermally operated switch that applies a steady ground connection to the wire 12. The switches 40 and 42 are typically thyristors that are switched into conduction intermittently by a trouble condition, but they might equally as well be mechanical switches. The result is to generate rectangular waveforms of varying duty cycles that are taken to a remote location on the same wire 12. An electronic circuit 14 at the remote location is powered by voltage on a line 46 that is typically supplied from an alternator or magneto that is driven by an outboard marine engine. The line 46 is connected to the enable unit 16 where it receives an interrupted signal from a conventional 555 timer integrated circuit 48. This allows the switches 40, 42 or 44 to drop out if they are thyristors. When a positive voltage is applied on the line 46, a pulse is generated through the capacitor 63 which causes the transistor 70 to conduct for a brief period of time during power-up. This provides a horn-test signal.

Following the initial test on power-up, the horn amplifier 20 will be inactive in the circuit until a trouble indication is received. Voltage on the line 12 will float to the voltage on the line 46, and the transistor 58 will be held out of conduction. Voltage on the emitter 64 of the transistor 58 will be maintained at 9.1 volts by a Zener diode 66.

Operation of one of the switches 40, 42 or 44 applies a ground on the wire 12, either periodically or steadily. This causes breakdown of the Zener diode 54 and the injection of a base current into the base 56 of the transistor 58 to cause the transistor 58 to conduct. The resulting voltage across a resistor 61 is taken to the horn amplifier 20 and to the logic amplifier 22. In the horn amplifier 20, a transistor 70 is switched into conduction, pulling a line 72 toward ground. This applies an increased operating voltage to the base of a transistor 74, which forms an oscillator at a frequency determined by the inductance of the transformer 76 and a capacitor 78. A piezoelectric horn 75 is connected in parallel with the capacitor 78 to provide an audible alarm when the transistor 70 is conducting. This means that a ground applied to the wire 12 by any one of the switches 40, 42 or 44 will cause the horn 76 to sound for essentially the length of time that the ground is applied. The application of such grounds for duty cycles thus provides a means of sounding coded alarms to identify which of the switches 40, 42 or 44 is closed.

The collector 60 of the transistor 58 is also connected by a line 82 to the logic amplifier 22 of FIG. 3. In FIG. 3, the line 82 is connected to a capacitor 84, one end of which is grounded. The line 82 is also connected through a resistor 85 to an amplifying transistor 86, which is operated essentially as an emitter follower. The emitter 88 of the transistor 86 is connected to ground through the parallel connection of a resistor 90 and a Zener diode 92. In the absence of a ground on the line 12 of FIG. 2, the voltage on the line 82 will be essentially zero, and the transistor 86 will not conduct. The voltage with respect to ground on the emitter 88 will be essentially zero and the Zener diode 92 will not be in breakdown.

The voltage at the emitter 88, which is taken to the decoder 26, is thus essentially zero in the absence of a signal indicating a ground at one of the switches 40, 42 and 44, and is the breakdown voltage of the Zener diode 92 when one of the switches 40, 42 and 44 is grounded. The decoder 26 is responsive to the voltage on the emitter 88 as a function of the duty cycle of that voltage. In the decoder 26, an SCR 94 is held off on power-up by a Zener diode 96. After power-up, the SCR 94 conducts when the emitter voltage of transistor 86 goes high. A network consisting of a series combination of a resistor 98, a capacitor 100 and a resistor 102 supplies the hold-off voltage on power up until the capacitor 100 is charged. The result is to generate on a line 104 a square wave having a duty cycle that corresponds to the duty cycle of closure of one of the switches 40, 42 and 44. The remainder of the circuit of decoder 26 detects predetermined duty cycles to develop appropriate signals. As will be seen, the possibility exists of a steady or DC signal. This may be regarded as a limiting case of the square wave, with a unity duty cycle.

The line 104 is connected to a resistor 110, which applies the signal on the line 104 to a network comprising the resistor 110 and a resistor 112 that is paralleled with a capacitor 114. The voltage across the resistor 112 and capacitor 114 is taken to the gate of an SCR 116 which is not conducting in the absence of a high enough voltage across the resistor 112. When the SCR 116 is triggered into conduction, current flows through a resistor 118 to develop a voltage that is taken as an input to each of three AND gates 120, 122 and 124 via line 125. Outputs of these AND gates are shown in Table 1, which is a truth table for the gates.

TABLE 1

| TRUTH TABLE FOR AND GATES 120, 122 AND 124 | | | | | |
|---|---|---|---|---|---|
| Line 125 | Line 127 | Line 131 | Gate 120 | Gate 122 | Gate 124 |
| 0 | 0 | 0 | 0 | 0 | 0 |
| 1 | 0 | 0 | 0 | 0 | 1 |
| 1 | 1 | 0 | 0 | 1 | 0 |
| 1 | 1 | 1 | 1 | 0 | 0 |

The signal on the line 104 is also applied to a resistor 126 and the parallel combination of a resistor 128 and a capacitor 130. The values of the resistors 126 and 128 and the capacitor 130 combine to select a duty cycle of the signal on the line 104 such that, when the capacitor 130 is charged to a sufficiently high value, an SCR 132 is triggered into conduction. This causes a flow of current in the resistor 134. The voltage across the resistor 134 is applied as a direct input to the AND gates 120 and 122 via line 127, and is connected through an invertor 136 to the AND gate 124 via line 129.

Discrimination among duty cycles of the signals on the line 104 is largely a function of the RC time constants of the resistor 112 and capacitor 114 for the SCR 116 and the resistor 128 and capacitor 130 for the SCR 132. Values of these components can be selected so that a signal of a low duty cycle will trigger one of the SCRs 116 and 132 and not the other. As the duty cycle of the signal on the line 104 is increased, both of the SCRs 116 and 132 will be triggered. This pattern is continued with connection of the line 104 to a resistor 138 which is connected to the base of a transistor 140. The transistor 140 is biased by a resistor 142. The emitter 144 of the transistor 140 is connected to a capacitor 146, which is grounded, and through a Zener diode 148 to an SCR 150. The circuit of the transistor 140 determines an RC charging time for the capacitor 146, and the combination can be set to respond to a duty cycle different from those controlling firing of the SCRs 116 and 132. When the SCR 150 conducts, a voltage across a resistor 152 is taken directly to the AND gate 120 via line 131, through an invertor 154 to the AND gate 122 via line 133, and through an invertor 156 to the AND gate 124 via line 135. When the AND gate 120 is enabled, a transistor amplifier 158 is turned on and lights a bulb 160. When the AND gate 122 is enabled, a transistor amplifier 162 similarly operates to light a bulb 164. Similarly, when the AND gate 124 is enabled, a transistor amplifier 168 operates to light a bulb 168.

The values of elements in the circuit that has been built for the practice of the invention are listed in Table 2, along with the time constants for triggering each of the SCRs 116, 132 and 150.

TABLE 2

Values of elements and triggering time constants in FIG. 3

| | |
|---|---|
| Resistor 110 | 47 kilohms |
| Resistor 112 | 47 kilohms |
| Capacitor 114 | 4.7 microfarads |
| Time constant for SCR 116 | 0.22 seconds |
| Resistor 126 | 330 kilohms |
| Resistor 128 | 220 kilohms |
| Capacitor 130 | 22 microfarads |
| Time constant for SCR 132 | 4.8 seconds |
| Resistor 138 | 47 kilohms |
| Resistor 142 | 47 kilohms |
| Capacitor 146 | 22 microfarads |
| Time constant for SCR 150 | approx. 10 seconds |

An inspection of these three time constants shows that the SCR 116 has the smallest controlling time constant. It will therefore respond to the square wave of the smallest duty cycle. The time constant of the SCR 132 is intermediate and that of the SCR 150 is longest. It is evident by inspection that any square wave of a duty cycle that will trigger the SCR 132 will also trigger the SCR 116, and that any square wave or duty value that will trigger the SCR 150 will also trigger the SCRs 132 and 116. The result of this has been shown in Table 2, the truth table of the outputs of the AND gates 120, 122 and 124 as a function of voltages indicated as logical levels on the resistors 118, 134 and 152. It can be seen from Table 2 that when none of the lines 125, 127 and 131 carries a high voltage level, there are no outputs from the AND gates 120, 122 and 124. When voltage on line 125 is high, indicating reception of a signal with the smallest effective duty cycle, the AND gate 124 is enabled, providing a low-oil signal indication from the bulb 168. When both the lines 125 and 127 are high, indicating the presence on the line 104 of the square wave of an intermediate duty cycle, the AND gate 122 is enabled, lighting the bulb 164 to indicate no oil. When all of the lines 125, 127 and 131 are high, indicating the presence on the line 104 of a signal with the longest duty cycle, the AND gate 120 enables the bulb 160, indicating a hot engine.

Figure 4:
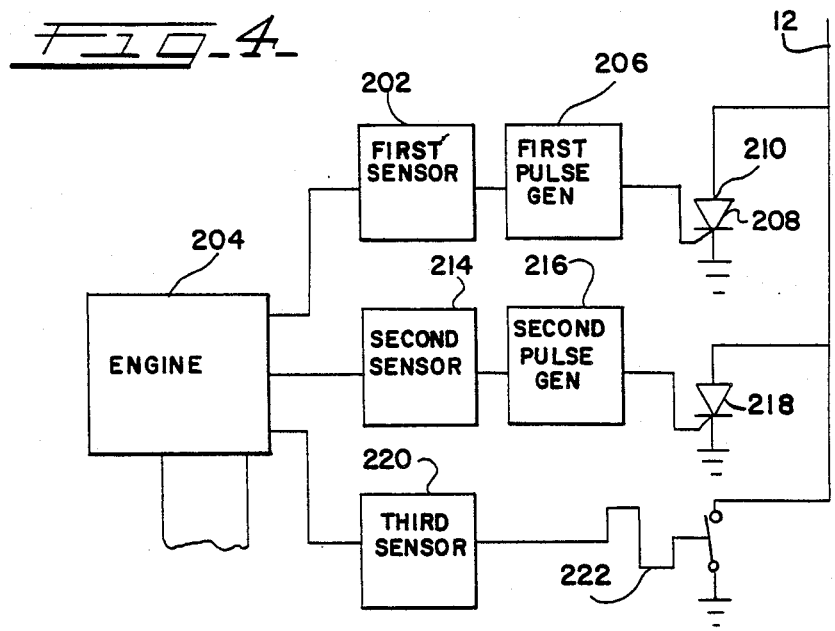
FIG. 4 is a block diagram of a circuit for producing indications of engine troubles.

FIG. 4 is a functional block diagram of a circuit that has been used in an engine to provide signals for the signal wire of FIG. 1. In FIG. 4, a first sensor 202 is connected to an engine 204 to detect a condition of low oil and produce a signal in response to this condition. The first sensor is connected to a first pulse generator 206 which produces periodic pulses at a first predetermined frequency. The first pulse generator is connected to trigger a first SCR 208 at the first predetermined frequency. When the first SCR 208 is triggered and a sufficient voltage is applied a its anode 210, the SCR 208 conducts, essentially grounding the single wire 12. To restore the open circuit if the first sensor 208 no longer senses low oil, the timer 48 of FIG. 2 interrupts the connection to the single wire 12 and hence to the anode 210 of the SCR 208 at a frequency higher than the frequency of the first pulse generator 206. The effect of this periodic interruption is not noticeable when the first SCR 208 is being triggered. A similar circuit provides a no-oil signal. A second sensor 214 is connected to the engine 204 to sense a condition of no oil. This is typically an oil-pressure sensor, responding to a low oil pressure while the first sensor 202 is typically an indicator of the level of oil in an oil tank. The second sensor 214 is connected to a second pulse generator 216 which is connected to trigger a second SCR 218 at a predetermined frequency which is different from the predetermined frequency of the first pulse generator 206. When a voltage is applied on the single wire 12 and the second SCR 218 is triggered by the second pulse generator 216, the single wire 12 is pulled substantially to electrical ground. An open circuit is restored if the second pulse generator stops applying a triggering signal to the second SCR 218 by the timer 48 of FIG. 2.

A third sensor 220 is connected to the engine 204 to respond to a condition of overtemperature. This could operate circuits like those controlling the SCRs 208 and 218 or it could, as shown in FIG. 4, trigger a thermally operated switch 222 to apply or remove a ground from the single wire 12. In the circuit of FIG. 4, when the thermally operated switch 222 is a bimetallic switch, or the like, it is not necessary to interrupt the electrical connection to the single wire 12, as required by the SCRs 208 and 218. However, the interruptions produced on the single wire 12 by the timer 48 of FIG. 2 are preferably at a frequency that is higher and the higher of the frequencies produced by the first and second pulse generators 206 and 216. This interruption will therefore not be audible in the operation of the circuit.

Figure 5:
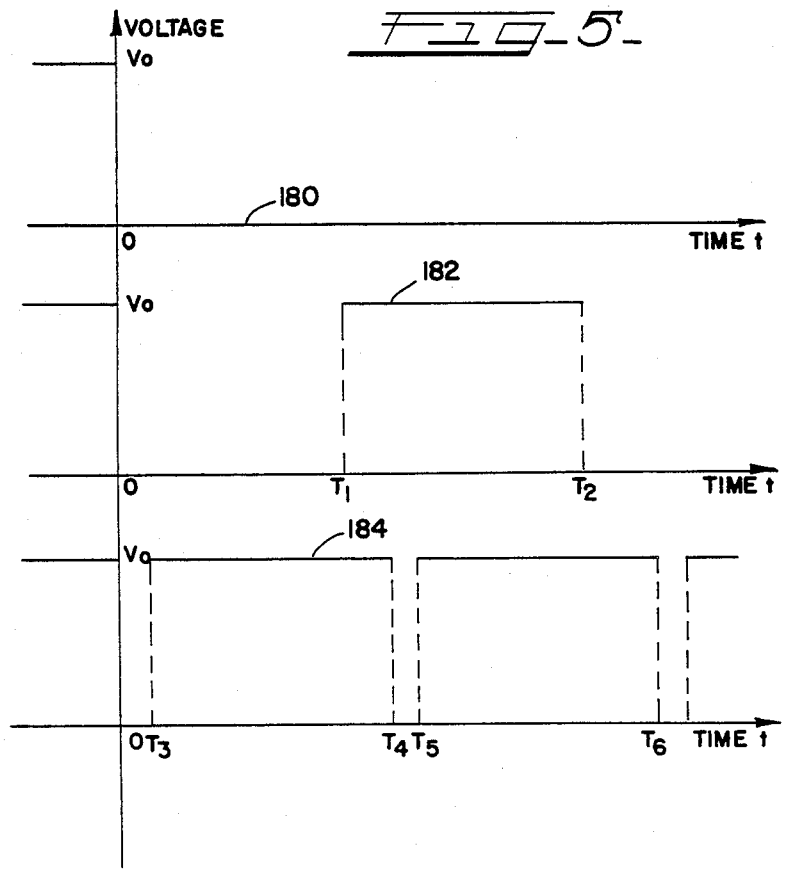
FIG. 5 is a time plot of waveforms indicating various engine conditions.

FIG. 5 is a set of time plots of signals that were developed in the preferred embodiment of the invention. Each of the time plots in FIG. 5 represents a value of voltage on the line 12 in response to operation of one of the switches 40, 42 and 44 at a time T=0. Thus, the curve 180 represents operation of the switch 44 of FIG. 2. All of the switches 40, 42 and 44 are presumed to be open before time t=0. At time t=0, the switch 44 is closed and stays closed, and the voltage at the line 12 drops to zero. The curve 182 represents a square wave corresponding to operation of the switch 42 indicating no oil. The curve 182 is rectangular wave of period $T_2$. The duty cycle of this rectangular wave is the ratio $T_1/T_2$. In the embodiment of the invention that was built, the period $T_2$ was inversely proportional to engine speed, but the duty cycle was maintained constant at 50%. Thus, in the preferred embodiment, $T_1=T_2$. A curve 184 represents the operation of the switch 40 of FIG. 2 in the preferred embodiment. This indicated low oil. The curve 184 is a rectangular wave having a period equal $T_4$, with a duty cycle of $T_3/T_4$. In the preferred embodiment, $T_3=0.1$ second, and $T_4=20$ seconds. This represented a duty cycle of 0.005.

The circuit of FIGS. 2 and 3 provide information about three different engine troubles on the single wire 12. However, it should be evident that additional switches could be placed in parallel with the switches 40, 42 and 44, and operated at different duty cycles to signal additional trouble conditions such as overspeed, cooling water temperature, and the like.

From the foregoing, it should be appreciated that an improved apparatus has been shown and described which has the desirable advantages of producing on a single electrical signals alerting an operator to one of a plurality of engine problems. The single wire is inexpensive to install and is more reliable in operation than a multi-wire cable with one wire dedicated to each engine problem.

The description of specific embodiments of the present invention is intended to set forth the best mode known to the inventor for the practice of the invention.

It should be taken as illustrative and not as limiting, and the scope of the invention should be limited only by the appended claims. Various features of the invention are set out in the following claims.

What is claimed is:

1. Apparatus for use in alerting an operator of an internal combustion engine, such as a marine engine of a boat, of operating conditions of the engine, wherein the operator is normally positioned at a location remote from the engine, comprising:

means for sensing at least two operating conditions of the engine and for providing a unique output signal for each of said sensed operating conditions, each of the unique output signals for each operating condition having a predetermined duty cycle different from the others and therefore being capable of distinguishing each operating condition from the others;

means for identifying each of said unique output signals that are applied thereto;

a single electrically conducting wire interconnecting said sensing means and said identifying means;

means connected to said identifying means for producing an alerting indication in response to said identifying means, said alerting indication providing information that identifies the status of at least one of the operating conditions.

2. Apparatus as defined in claim 1 wherein said alerting indication comprises an audio alert and a visual indication of the particular operating condition status.

3. Apparatus as defined in claim 2 wherein the status of the operating condition being indicated comprises a trouble or problem condition of the engine.

4. Apparatus as defined in claim 3 wherein said sensing means senses at least three operating conditions of the engine and includes an overheat status condition, a low engine oil status condition and a no engine oil status condition.

5. Apparatus as defined in claim 2 wherein said alerting indication producing means which produces the audio alert comprises:

a horn amplifier electrically connected to said single wire; and, a horn connected to the horn amplifier to sound an audible alert at a predetermined duty cycle that is associated with the particular operating condition of the engine.

6. Apparatus as defined in claim 1 wherein said sensing means comprises means for producing said unique output signal for each of said sensed operating conditions, said means for producing said unique output signal selectively applying and removing a predetermined voltage to the single wire at each of said unique and predetermined duty cycles.

7. Apparatus as defined in claim 6 wherein said unique output signal producing means comprises a plurality of switches, each having one end connected to said single wire and the other end connected to ground, each of the switches being operable to open and close at said unique and predetermined duty cycle selected to identify a particular operating condition of the engine.

8. Apparatus as defined in claim 7 wherein each of said switches have duty cycles of varying duration.

9. Apparatus as defined in claim 1 wherein the identifying means comprises:

a logic amplifier;

a decoder means for producing a plurality of sets of said unique output signals, one set of said unique output signals being associated with each particular operating condition; and, said alerting indication producing means including a plurality of visual indication producing means connected to said decoder means, each of said visual indication producing means being selectively activated by one of said plurality of sets of said unique output signals.

10. Apparatus as defined in claim 1 further comprising an enable means connected between the identifying means and the single wire adapted to interrupt current flow through said sensing means at a predetermined rate in response to said sensing means providing at least one of said unique output signals.

11. Apparatus as defined in claim 10 wherein the identifying means comprises:

a logic amplifier;

a decoder means for producing a plurality of sets of unique signals, one set of unique signals being associated with each particular operating condition; and, said means for producing an altering indication including a plurality of visual indication producing means connected to said decoder means, each of said visual indication producing means being selectively activated by one of said plurality of sets of unique signals.

12. Apparatus for use in alerting an operator of an internal combustion engine, such as a marine engine of a boat, of operating conditions of the engine, wherein the operator is normally positioned at a location remote from the engine, said apparatus comprising:

means for sensing at least two operating conditions of the engine and for providing a switched output signal for each of said sensed operating conditions, the switched output signal for each operating condition comprising a unique and predetermined duty cycle so as to distinguish each operating condition from the others;

means for identifying each of said switched output signals that are applied thereto;

a single electrically conducting wire interconnecting said sensing means and said identifying means; and, means connected to said identifying means for producing an alerting indication in response to said identifying means, said alerting indication providing information that includes the status of at least one of the operating conditions.

13. Apparatus as defined in claim 12 wherein said alerting indication comprises an audio alert and a visual indication of the particular operating condition status.

14. Apparatus as defined in claim 13 wherein the status of the operating condition being indicated comprises a trouble or problem condition of the engine.

15. Apparatus as defined in claim 14 wherein said sensing means senses at least three operating conditions of the engine and includes an overheat status condition, a low engine oil status condition and a no engine oil status condition.

16. Apparatus as defined in claim 15 wherein said means for producing said switched output signal selectively applying and removing a predetermined voltage to the single wire at each of said unique and predetermined duty cycles.

17. Apparatus as defined in claim 16 wherein said switched output signal producing means comprises a plurality of switches, each having one end connected to said single wire and the other end connected to ground, each of the switches being operable to open and close at said unique and predetermined duty cycle selected to identify a particular operating condition of the engine.

18. Apparatus as defined in claim 17 wherein each of said switches have duty cycles of varying duration.

19. Apparatus as defined in claim 13 wherein said alerting indication producing means which produces the audio alert comprises:
- a horn amplifier electrically connected to said single wire; and,
- a horn connected to the horn amplifier to sound an audible alert at a predetermined duty cycle that is associated with the particular operating condition of the engine.

20. Apparatus for use in alerting an operator of an internal combustion engine, such as a marine engine of a boat, of operating conditions of the engine, wherein the operator is normally positioned at a location remote from the engine, comprising:
- a plurality of switches located at the internal combustion engine, each of the switches being adapted to alternately open and close responsive to an operating condition exceeding a predetermined status limit and provide an electrical signal at a unique and predetermined duty cycle relative to the signal provided by the other switches, each of the signals being a function of a particular operating condition of the engine;
- an electrically insulated, electrically conducting wire connecting the switches at the engine to the remote location;
- an enabling means connected to the wire to interrupt current through a closed one of said switches;
- a buffer connected to the enabling means and adapted to receive said electrical signal produced by operation of one of said switches;
- a horn oscillator;
- a piezoelectric horn connected to the horn oscillator and adapted to produce an audible alarm when said horn oscillator is operating;
- a decoder means connected to the buffer and receiving the enabling signal from the buffer, the decoding means producing a first output in response to an enabling signal having a low duty cycle, a second output in response to an enabling signal having an intermediate duty cycle, and a third output in response to an enabling signal having a high duty cycle.

21. Apparatus as defined in claim 20 further comprising a plurality of light producing means, a first one of said plurality being connected to said first output of said decoding means, a second one of said plurality being connected to said second output of said decoding means and a third one of said plurality being connected to said third output of said decoding means.

* * * * *